United States Patent [19]
Holopainen

[11] 3,977,547
[45] *Aug. 31, 1976

[54] MATERIAL HANDLING APPARATUS

[76] Inventor: Vaino J. Holopainen, c/o Channel Construction, Inc., P.O. Box 668, Troy Road, Keene, N.H. 03431

[ * ] Notice: The portion of the term of this patent subsequent to Apr. 30, 1991, has been disclaimed.

[22] Filed: Mar. 26, 1974

[21] Appl. No.: 454,859

Related U.S. Application Data

[62] Division of Ser. No. 150,347, June 7, 1971, Pat. No. 3,807,586.

[52] U.S. Cl. .......................................... 214/131 R
[51] Int. Cl.² ...................................... E02F 3/00
[58] Field of Search ........... 214/130 R, 131 R, 140, 214/138 R, 138 C, 778, 141; 180/51

[56] References Cited
UNITED STATES PATENTS

| | | | |
|---|---|---|---|
| 3,305,039 | 2/1967 | Molby | 180/51 |
| 3,407,947 | 10/1968 | Valla | 214/141 |
| 3,430,790 | 3/1969 | Beltrami | 214/138 C |
| 3,606,048 | 9/1971 | Long | 214/138 R |
| 3,612,310 | 10/1971 | Schaeff | 214/138 R |
| 3,807,586 | 4/1974 | Holopainen | 214/138 R |

Primary Examiner—Robert J. Spar
Assistant Examiner—Ross Weaver
Attorney, Agent, or Firm—Norman S. Blodgett; Gerry A. Blodgett

[57] ABSTRACT

This invention relates to a material handling apparatus and, more particularly, to apparatus for use in industrial and excavating operations, wherein an articulated vehicle is associated with an accessory tool.

7 Claims, 10 Drawing Figures

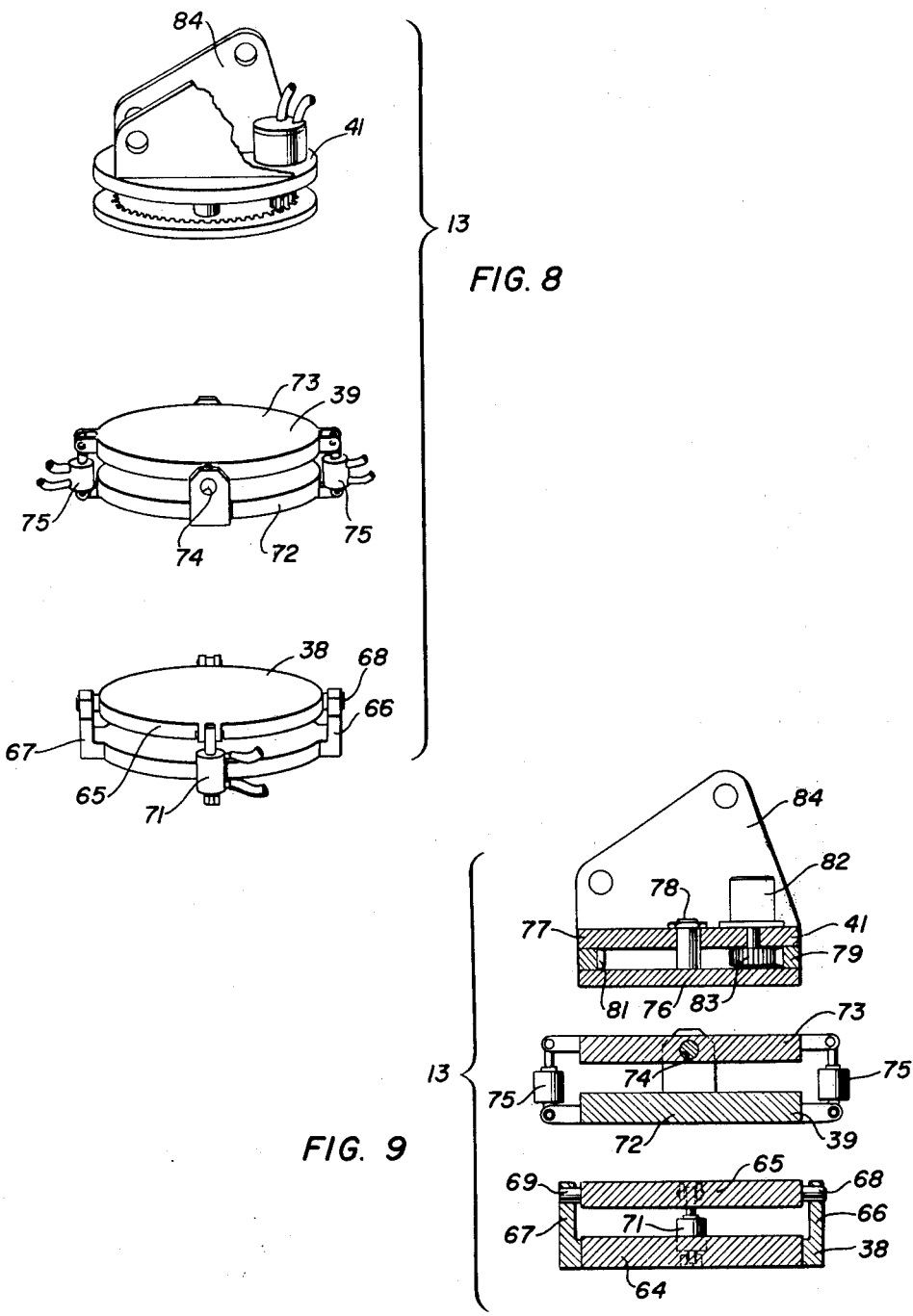

MATERIAL HANDLING APPARATUS

This is a division of application Ser. No. 150,347 filed June 7, 1971, now U.S. Pat. No. 3,807,586.

BACKGROUND OF THE INVENTION

In the manufacture of equipment for material handling, such as excavating and industrial transportation, the use of hydraulically operated accessory tools has increased over the years. Unfortunately, the equipment has developed in an erratic manner from the situation where accessories were attached to the back of a common agricultural-type tractor to the present equipment which is similar to the old type but differs from it only in that the tractor and the accessories are larger. The function of the equipment has not changed and, unfortunately, the application of various accessory tools has necessitated a large variety of different types of vehicles for carrying these tools. The result is that the apparatus manufacturer is faced with the problem not only of manufacturing an inordinately large variety of prime movers of vehicles and the accessories associated with them, but is also faced with a parts problem; that is to say, the manufacturer and the dealer must store a very large number of spare parts in order to satisfy the needs of the consumer. Furthermore, because the present materials handling apparatus have been based upon a simple extrapolation of these early primitive designs, the function is the same, even though they are capable of handling heavier loads. The manner of handling materials has not changed over the years. Accessory tools, such as boom and dipper-stick type hydraulic backhoes, are extremely limited in their application to vehicles as they are presently constructed; for instance, it is difficult to cut vertical trenches when the vehicle is resting on an inclined slope. It is difficult to cut smooth sides on a banking with the vehicle in fixed position because the angularity of the cutting edge changes as the accessory tool is rotated or swung. Furthermore, attempts to apply various kinds of accessory tools to the same vehicle result in substantial mis-matching to the point where the accessory tool is not very useful because it happens to be attached to the wrong vehicle. One of the problems encountered, for instance, in hydraulic backhoe applications, is that it is impossible to cut a trench close to a wall or a building because of the fact that the bulk of the vehicle prevents the centerline of the boom and dipper stick combination from being close enough to the wall. In other words, it is necessary to dig the trench outwardly of the wall a substantial distance. Attempts to overcome this by the use of so-called "side shift" devices have been less than adequate because these side shift devices are not capable of carrying large loads, they are complicated, and they operate with difficulty when they are exposed to the dirt and dust of a practical excavating situation. In the prior art devices, again, the use of the conventional hydraulic backhoe is limited because there is no way of changing the angular aspect of the bucket, nor is there any way of changing the effective length of the support on which the bucket is mounted. It is impossible, for instance, to grade slopes with the conventional hydraulic backhoe because the aspect of the cutting edge of the bucket changes with the swinging about the vertical axis at the rear of the vehicle. These and other difficulties experienced with the prior art devices have been obviated in a novel manner by the present invention.

It is, therefore, an outstanding object of the invention to provide a material handling apparatus incorporating principles which permit the use of a limited number of vehicle designs with an extremely large number of accessory tools.

Another object of this invention is the provision of a material handling apparatus of such a design that a manufacturer need only produce a few particular vehicles, these vehicles being applicable to a wide range of functional uses.

A further object of the present invention is the provision of a material handling apparatus including an articulated hydraulic backhoe accessory tool capable of operating to dig a trench or the like close to a wall or a building without the use of expensive, intricate, and weak side-shift structure.

It is another object of the instant invention to provide a material handling apparatus which permits a wide variation of operative accessory devices with a limited number of primary designs of vehicle accessory tool and junction elements.

A still further object of the invention is the provision of a material handling apparatus capable of operating over a large range of functional uses in excavating in industrial areas wherein the primary vehicle is of a single design, the changes only being necessary in size of load-bearing capacity.

It is a further object of the invention to provide a material handling apparatus making full use of the modular concept of manufacturing.

It is a still further object of the present invention to provide a material handling apparatus making use of the combination of a vehicle with a hydraulic backhoe, wherein the backhoe is capable of digging to extremely large depths, heights, and distances from the vehicle; wherein grading of sloped surfaces can be easily accomplished; and wherein the boom is capable of an extremely wide angle of swing.

Another object of the invention is the provision of a material handling apparatus including a hydraulic backhoe having telescoping boom capacity, wherein extremely long reaches are available and yet the boom can be telescoped for lifting the load from the excavation and for transporting or moving the bucket with its load to other angular positions for loading on a truck or the like.

A further object of the invention is to provide a material handling apparatus using a hydraulic backhoe wherein it is possible to maintain rotation of a turntable in a level attitude, thus eliminating the difficult condition of swinging loads up an inclined plane, as often encountered in backhoe and crane operations.

A still further object of the invention is the provision of a material handling apparatus using a hydraulic backhoe with swing available in the order of 300°, wherein such swinging under load is accomplished without unduly stressing the vehicle or endangering the operator; and wherein swinging through such large angles is possible without the large power consumption that is necessary when the turntable is not in a horizontal position or when a load is being swung into a downhill position where its ability to tip the vehicle is very great.

A further object of the invention is to provide a material handling apparatus making use of a conventional articulated boom and dipper-stick assembly wherein various accessory tools may be attached to the extreme end of the combination and used to its fullest capacity without being limited to the motions normally available from a hydraulic backhoe; more specifically, in such a combination, the tool may be subjected to motion in a pitch, roll, or yaw mode.

Another object of the invention is the provision of a material handling apparatus having the advantage of modular construction with the elimination of many special carriers for each particular material handling application, the reduction of inventory of components in manufacture and distribution by the interchangeability of parts and accessories.

A still further object of the instant invention is to provide a material handling apparatus having a hydraulic backhoe accessory tool which is capable of reaching over intervening obstacles and operating effectively despite the presence of such an obstacle.

With these and other objects in view, as will be apparent to those skilled in the art, the invention resides in the combination of parts set forth in the specification and covered by the claims appended hereto.

SUMMARY OF THE INVENTION

In general, the present invention consists of a material handling apparatus having a vehicle comprising a front wheeled portion and a rear wheeled portion joined for articulation about a vertical axis lying between the wheels, and having a junction element located in the vicinity of the said axis and consisting of two parts joined for rotation about various axes, one of the parts being connected to the vehicle and the other part being adapted to receive an accessory tool. The junction element consists of a first portion having two parts joined for rotation about an axis extending substantiaally longitudinally of the vehicle, a second part consisting of two parts joined for rotation about an axis extending transversely of the vehicle, and a third part consisting of two parts joined for rotation about an axis extending substantially vertically and coaxially of the above-mentioned vertical axis.

BRIEF DESCRIPTION OF THE DRAWINGS

The character of the invention, however, may be best understood by reference to one of its structural forms, as illustrated by the accompanying drawings in which:

FIG. 8 is a perspective exploded view of a junction element;

FIG. 9 is a vertical sectional view of the junction element; and

DESCRIPTION OF THE PREFERRED EMBODIMENT

Figure 1:
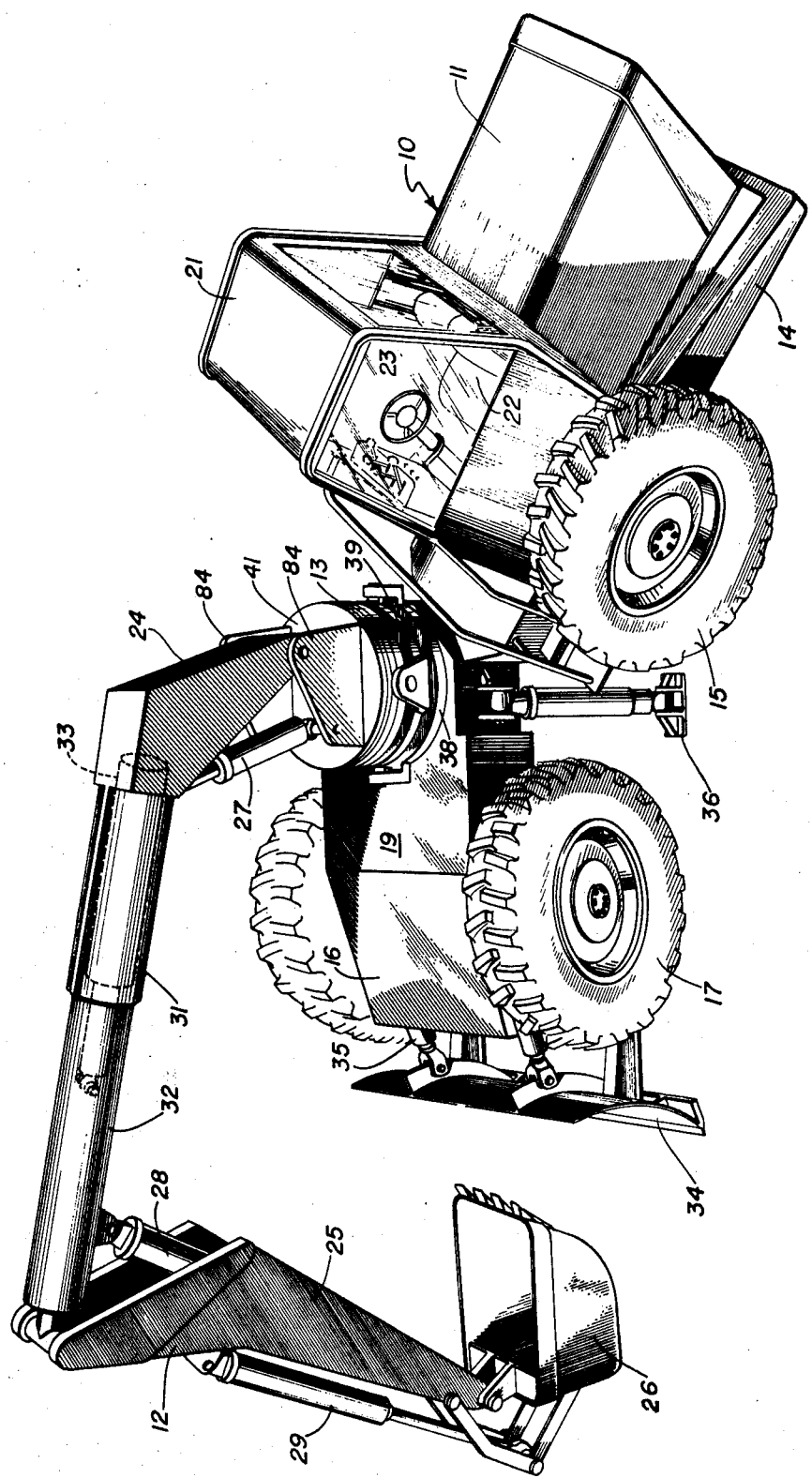
FIG. 1 is a perspective view of a material handling apparatus embodying the principles of the present invention.

Referring first to FIG. 1 wherein are best shown the general features of the invention, the material handling apparatus, indicated generally by the reference numeral 10, is shown as consisting of a vehicle 11, an accessory tool 12, and a junction element 13. The vehicle 11 consists of a rear portion 14 having wheels 15 and a front portion 16 having wheels 17. The front and the rear portion are joined by a vertical shaft 18 to provide for articulation about a vertical axis located midway between the wheels 15 and the wheels 17. The front portion 16 is provided with a mounting platform 19 on which is attached the junction element 13 and the accessory tool 12. The rear portion 14 of the vehicle is provided with a cab 21 within which lies an operator's seat 22 as well as hydraulic valve operating levers (not shown). The seat, steering wheel, and control levers are rotatable as a unit from a forwardly-facing position to a rearwardly-facing position at the discretion of the operator. The rear portion 14 contains the engine and an articulated drive connects the engine to the wheels 15 and 17 in the well-known manner.

The accessory tool 12 is shown for purposes of illustration as a hydraulic backhoe assembly consisting of a boom 24, a dipper stick 25, and a bucket 26. The boom 24 is hingedly connected to ears extending from the top of the junction element 13. The dipper stick 12 is hinged connected at one end to the outer end of the boom 24, and at its other end to the bucket 26. The boom is rotated about its pivot by means of hydraulic linear actuators 27. The dipper stick is rotated about the end of the boom by a hydraulic linear actuator 28, while the bucket is rotated about its axis on the end of the dipper stick by means of a hydraulic linear actuator 29. In addition, the boom 24 is made up of two tubular telescoping parts 31 and 32 which are slidable relative to one another and can be locked in place by means of a hydraulic linear actuator 33 located in their hollow interiors.

Extending forwardly from the front portion 16 of the vehicle 11 is a forwardly-directed stabilizer 34 whose position is selected and locked in place by means of hydraulic linear actuators 35. Extending laterally from the forward portion 16 of the vehicle in the vicinity of the articulating shaft 18 are stabilizers 36 adjustable and lockable in place by means of hydraulic linear actuators 37. The junction element 13 will be shown in more detail later on, but consists generally of a first portion 38, a second portion 39, and a third portion 41 permitting motion of the boom 24 and the elements attached to it relative to the platform 19 in the roll, pitch, and yaw modes, respectively.

Figure 2:
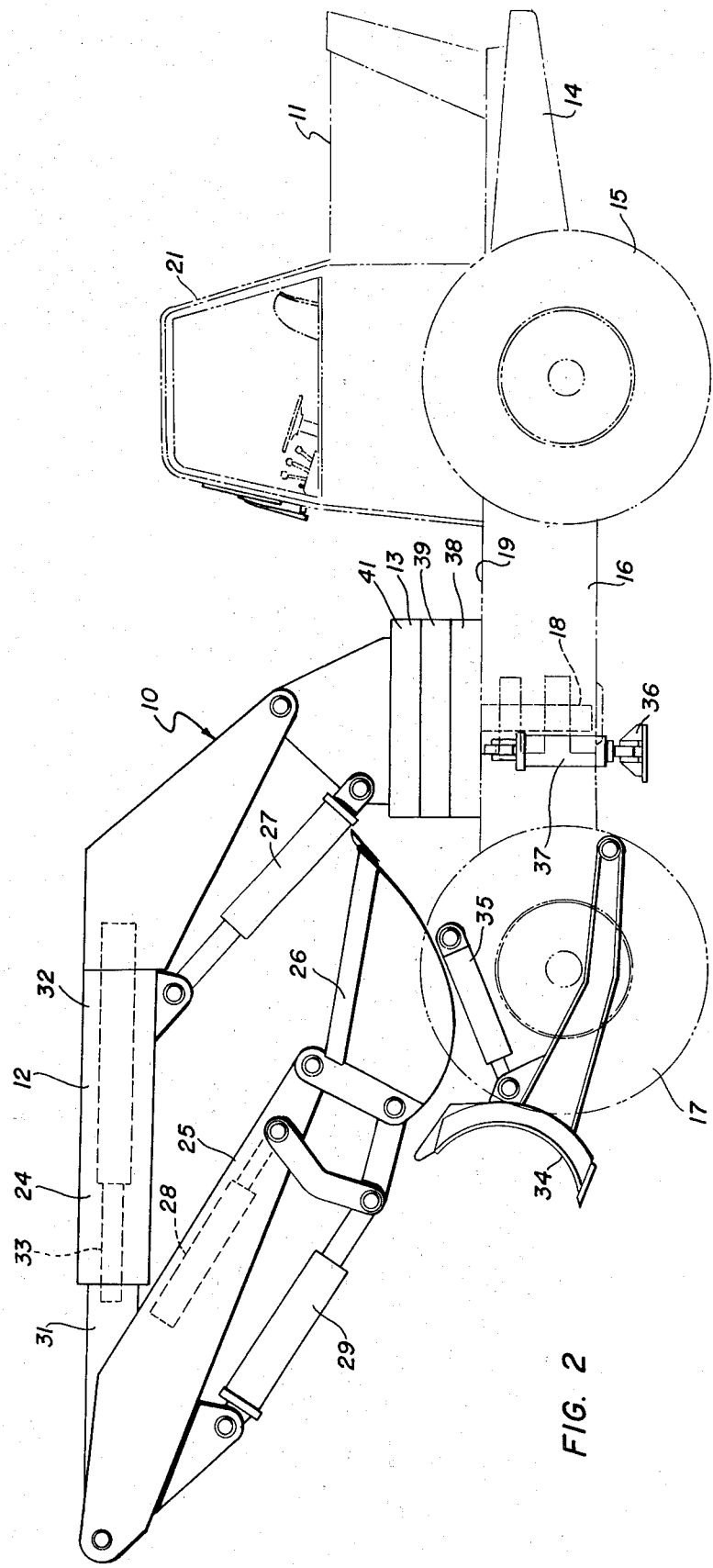
FIG. 2 is a side view of the material handling apparatus.

In FIG. 2, the accessory tool 12 is shown in "carry" position with the bucket 26 resting on the front portion 16 of the vehicle between the wheels 17. The telescoping boom 12 is brought to its most closed position, and the junction element 13 has its first, second, and third portions 38, 39, and 41 arranged so that the boom 12 is in a generally level centralized position. The stabilizers are all drawn out of engagement with the ground.

Figure 3:
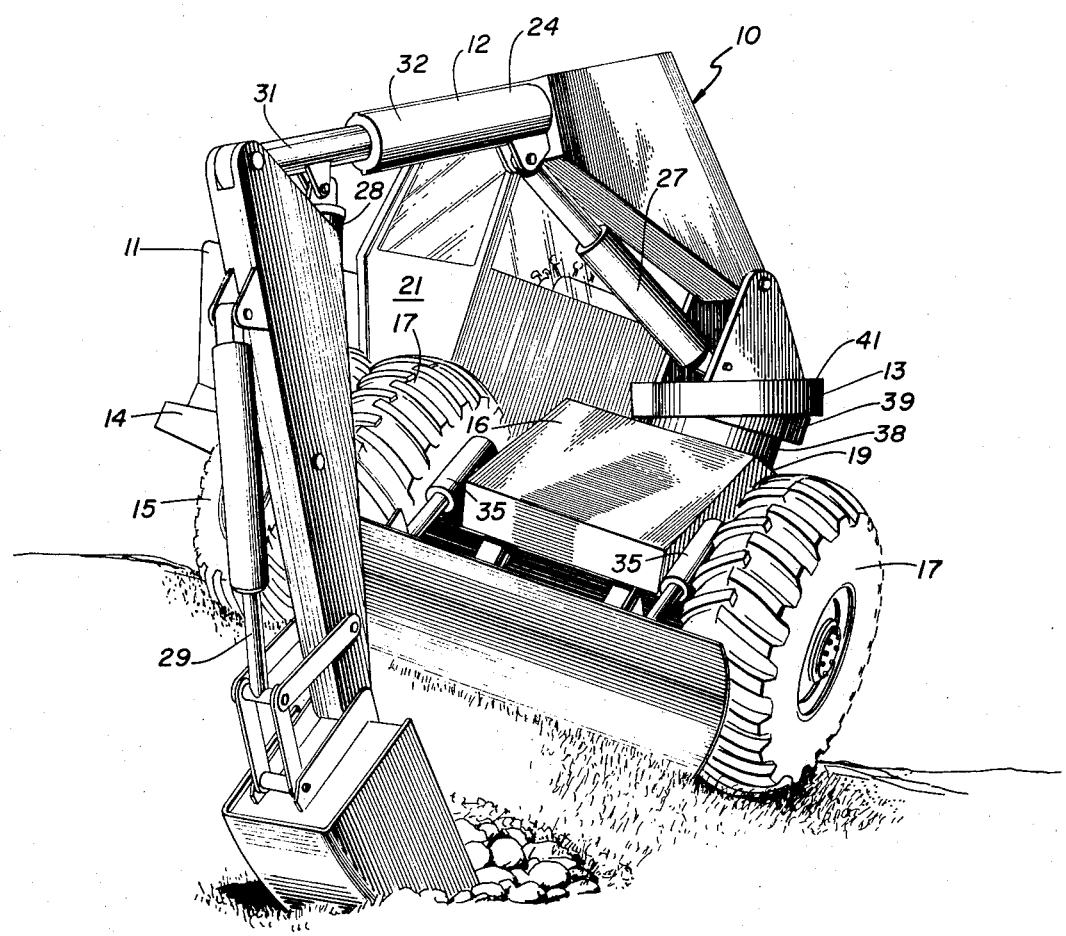
FIG. 3 shows the material handling apparatus in perspective performing a certain operation.

FIG. 3 shows the way in which the cutting edge of the bucket can be inclined relative to the remainder of the vehicle when grading slopes or performing similar operations. From this it can be seen that, irrespective of the angle of the vehicle to the slope, the cutting edge of the bucket 26 can be arranged to be parallel to the surface of the slope to perform smoothing operations.

Figure 4:
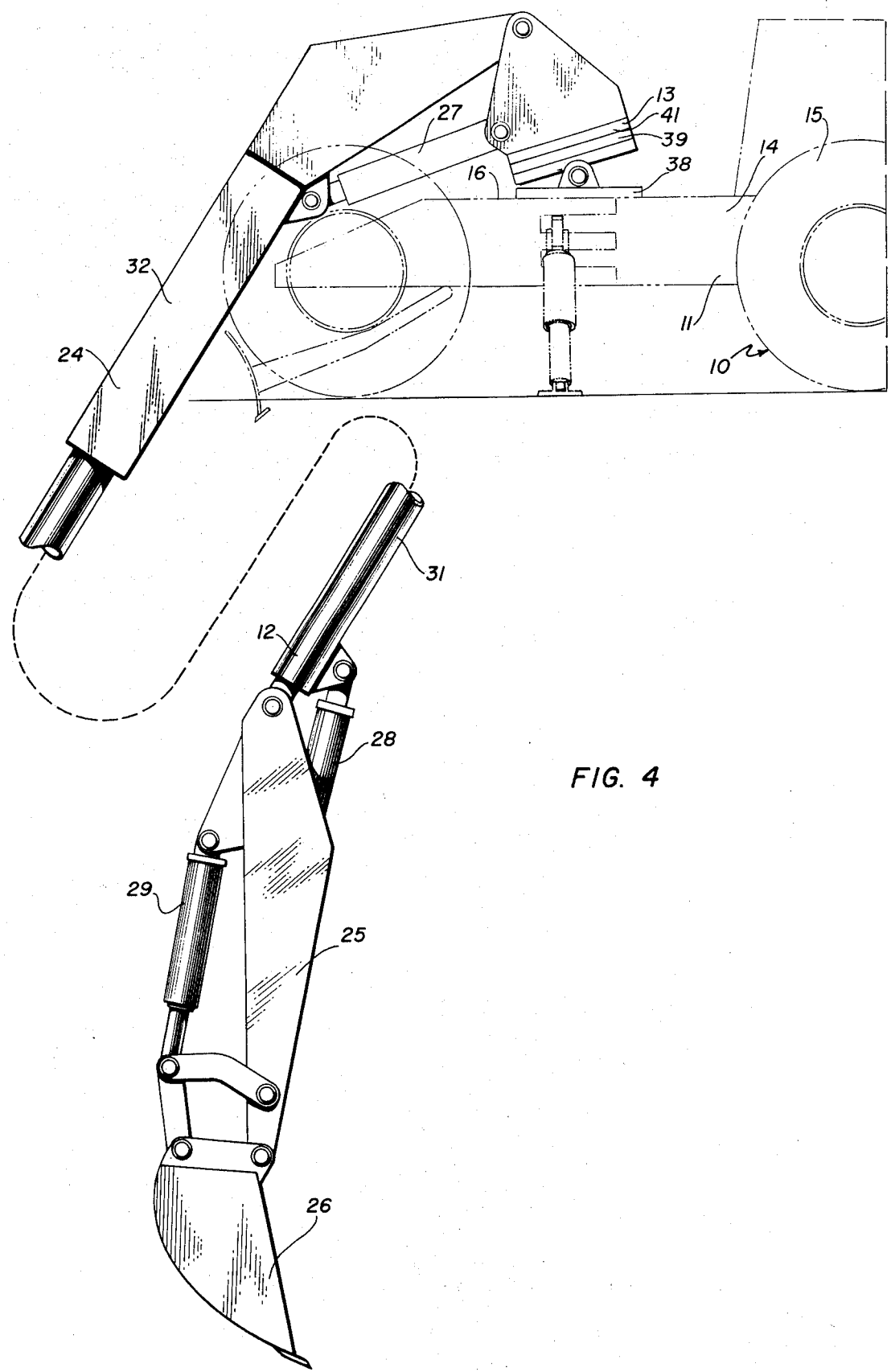
FIG. 4 is a side view of the apparatus performing another operation.

FIG. 4 shows the manner in which the use of the junction element 13 and the telescoping boom 24 can be used to obtain extremely great depth in digging and also to obtain extreme undercutting for the finishing of the faces of holes. The first portion 38 of the junction element 13 is inclined by its axis to throw the pivot point of the boom to the front, while the telescoping boom is extended. In many situations, the telescoping movement of the boom can be used for bringing the bucket along a certain line to obtain a scraping action.

Figure 5:
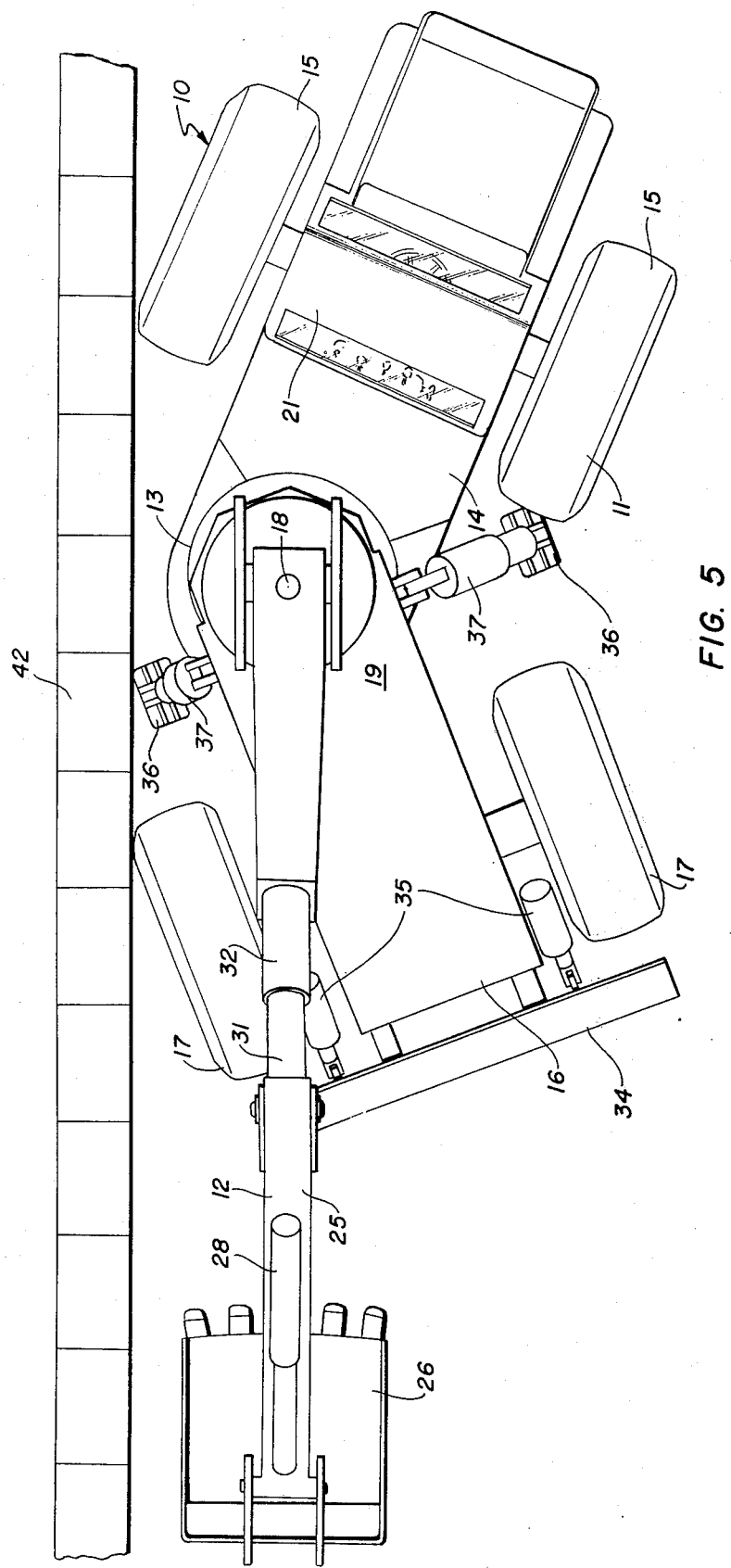
FIG. 5 is a plan view of the apparatus forming a still third operation.

FIG. 5 shows the manner in which the apparatus can be used for digging a trench close to a wall 42 or a building. The vehicle 11 is articulated or arranged with the rear portion 14 and the front portion 16 at a substantial angle with the wheels close to the wall 42. Then the accessory tool 12 is rotated by means of the third portion 41 of the junction element 13 to a position where the boom 24 is parallel to the wall, and the shovel 26 extends with its cutting edge at a right angle to the wall surface and close to the wall surface. It is possible in this condition of the apparatus to cut a trench parallel to the wall. Material can be deposited in a truck parked outwardly of the vehicle from the wall by swinging the accessory tool 12 about the pivot provided by the third portion 41 and articulating the boom and dipper stick and bucket in the usual way. With both portions of the apparatus articulated in an opposite direction as that described, a wide swath of trench can be excavated from said position.

Figure 6:
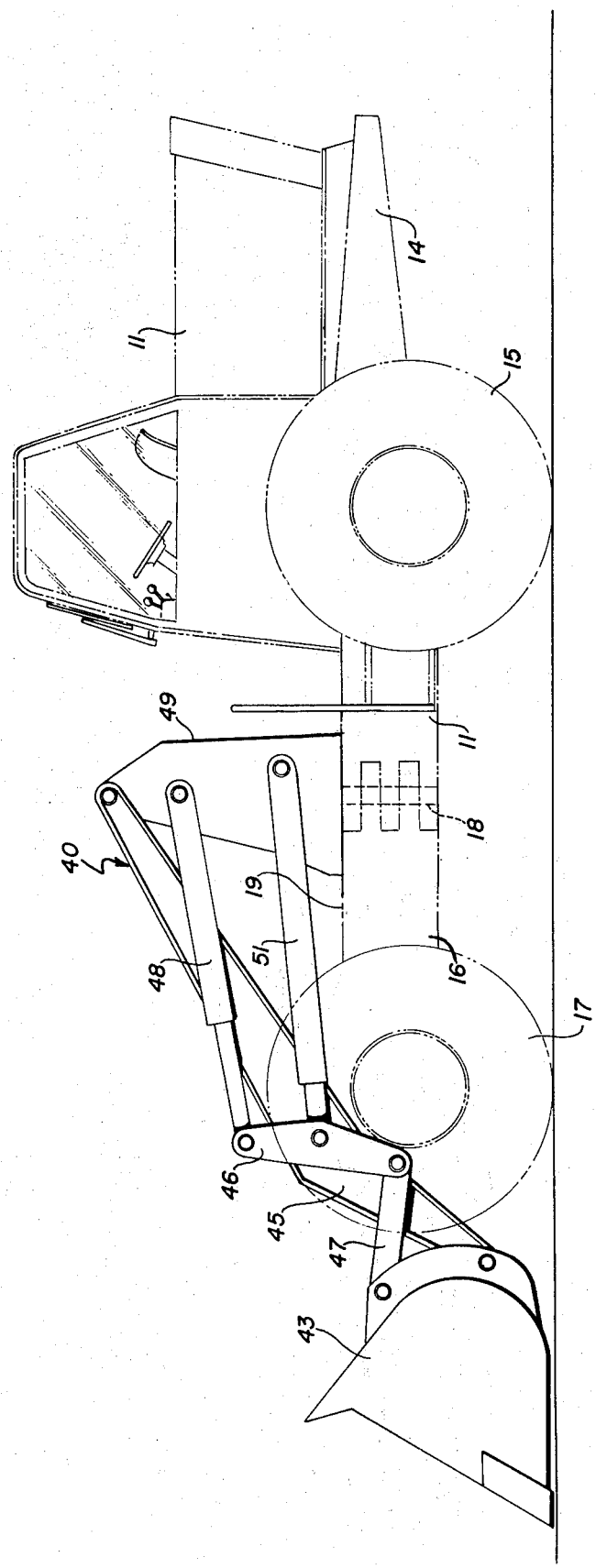
FIG. 6 is a plan view of the apparatus making use of a loader as an accessory tool.

FIG. 6 shows the way in which a loader 43 can be attached to the vehicle 11 with the junction element 13 interposed between the two to operate as a material handling apparatus. The stabilizer 34 and the actuator 35 would be removed. A bucket 40 is hingedly connected to the outer ends of arms 45 which are pivoted at their other ends to the top of a base element. A bellcrank 46 is connected at one end by a lever 47 to the upper part of the bucket 44, while its other end is connected by a hydraulic linear actuator 48 to an ear 49 extending upwardly from the base. Another hydraulic linear actuator 51 connects the ear 49 to the middle part of the crankarm 46. Two sets of these last-named actuator, lever, and crankarm elements are provided on opposite sides of the centerline of the vehicle.

Figure 7:
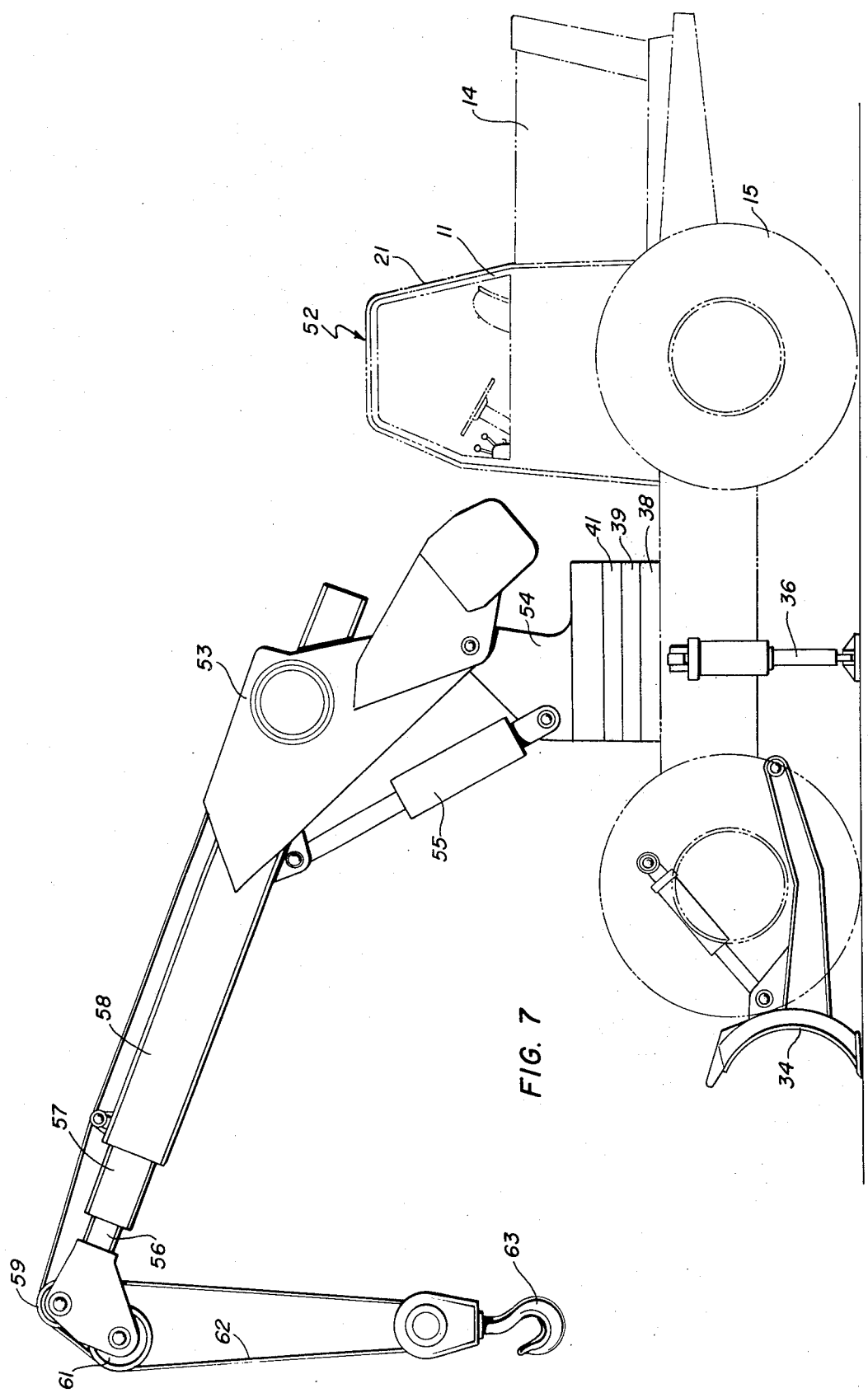
FIG. 7 is a side view of the apparatus making use of a telescoping derrick as an accessory tool.

In FIG. 7 is shown a material handling apparatus with the vehicle 11 and the junction element 13 in use with an accessory tool consisting of a derrick. A boom 53 is hingedly connected to an ear 54 extending from the top of the junction element 13. The hydraulic linear actuator 55 connects the ear 54 to the boom 53 to produce angulation thereof. The boom 53 is made up of three telescoping parts 56, 57, and 58 operates by internal hydraulic linear actuators (not shown). The outer end of the part 56 is provided with pulleys 59 and 61 over which passes a cable 62 associated with a block and hook element 63. It can be seen that, in addition to the extension of the boom provided by the telescoping parts 56, 57, and 58, the boom can have its angle substantially set by the cylinder 55 with an additional angulation provided by the second portion 39 of the junction element. It can be rotated about 300° by means of the third portion 41 of the junction element and, if necessary, it can be tipped in the roll mode by means of the first portion 38 of the junction element. During rotation, the vehicle is protected by the stabilizers 34 and 36 which are in place to absorb shock and force produced by the load on the boom.

The structure and operation of the junction element 13 will be readily understood from an examination of FIGS. 8 and 9. The first portion 38, which operates to set up adjustments in the "roll" mode of motion, consists of a first part 64 and a second part 65. The first part 64 is adapted to be bolted to the platform 19 of the vehicle in a position overlying the articulation shaft 18. Extending upwardly from the first part are ears 66 and 67 which receive journals 68 and 69 extending outwardly from the second part 65. The journals 68 and 49 are arranged on a common axis which extends longitudinally of the vehicle and intersects the axis of the shaft 18. Hydraulic linear actuators 71 join the first and second parts to produce the angulation adjustment and to lock them in place at a selected angularity.

The second portion 39 arranges for motion in "pitch" or about a transverse horizontal axis. More specifically, the second portion 39 consists of a first part 72 and a second part 73 joined by a transverse shaft 73. Ninety degrees away from the shaft axis are located hydraulic linear actuators 75 which serve to select the angulation between the first part 72 and the second part 73 and to lock them at that condition.

The third portion 41 consists of a first part 76 adapted to be bolted to the second part 73 of the second portion 39 and a second part 77. The second part 77 rests on the first part 76 and the two are pivotally joined by a vertical shaft 78 which, in the preferred embodiment, is co-axial with the articulation shaft 18 of the vehicle 11. The first part 76 is provided with an upwardly extending peripheral flange 79, the inner surface of which is provided with an internal gear 81. Mounted on the second part 77 is a hydraulic rotary acctuator 83 having a pinion gear 83 which engages the internal gear 81 to rotate the second part 77 relative to the first part 76 about the axis of the shaft 78. The second part 77 is provided with means for attaching an accessory tool, the said means consisting, for instance, of a pair of ears 84. It will be understood that the junction element may be made up in various different ways; for instance, by making the first part 64 of the first portion 38 integral with the platform 19 of the vehicle. Furthermore, the second part 65 of the first portion 38 could be made integral with the first part 72 of the second portion 39. In a like manner, the second part 73 of the second portion 39 could be made integral with the first part 76 of the third portion 41.

Figure 10:
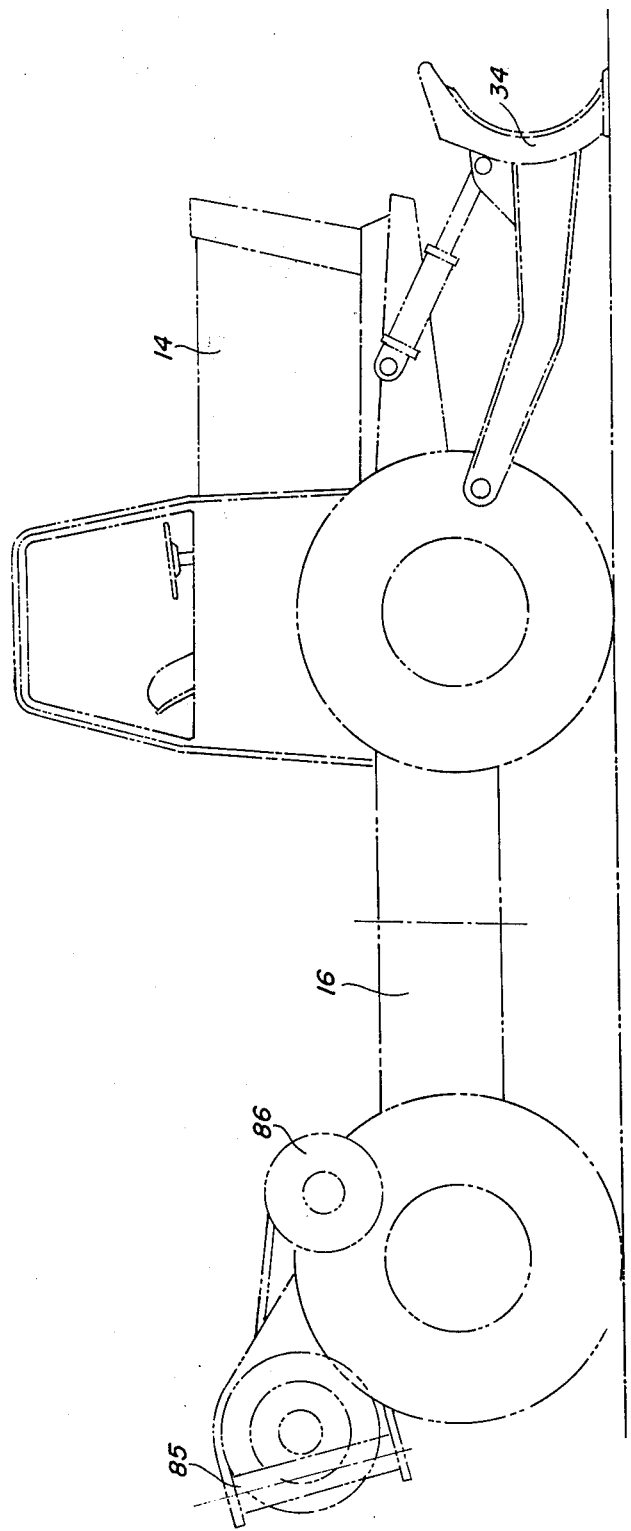
FIG. 10 is a side view of the apparatus making use of accessory blade, winch, and logging arch.

FIG. 10 is a side view of the apparatus arranged as a logging skidder. A logging arch 85 is attached to the front portion 16 and is used with a winch 86. In this application it is contemplated that the blade 34 would be used with the rear portion 14.

It will be understood that the usual hydraulic interconnections, valves, and controls will connect all of the actuators of the material handling apparatus in a manner which is well-known in the art.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. Material handling apparatus, comprising a. a vehicle consisting of a front wheeled portion and a rear wheeled portion joined for articulation about a vertical axis lying between the wheels, the rear wheeled portion having an operator's seat and controls, and
b. a junction element mounted on the front wheeled portion in the vicinity of the said axis and consisting of two parts joined for relative rotation about an axis extending transversely of the vehicle and passing through the said vertical axis, one of the parts being connected to the vehicle and the other part being adapted to receive an accessory tool.

2. Material handling apparatus as recited in claim 1, wherein the accessoyr tool is an excavator consisting of a hydraulically-operated boom and dipper stick assembly.

3. Material handling apparatus as recited in claim 2, wherein the boom is telescopically extensible and is provided with an actuator lying within hollow elements of the boom.

4. Material handling apparatus as recited in claim 3, wherein a bucket is hingedly connected to the end of the assembly.

5. Material handling apparatus as recited in claim 2, wherein a loading bucket is connected to the outer end of the assembly.

6. Material handling apparatus as recited in claim 1, wherein the accessory tool is a derrick having a multi-section boom element wherein the sections are telescopically connected and provided with actuators for extending and contracting the boom.

7. Material handling apparatus as recited in claim 1, wherein the accessory tool is a loader having a wide bucket and having hydraulic actuators for changing the angularity of the bucket and for lifting it.

* * * * *